US012387897B2

(12) United States Patent
Shimizu et al.

(10) Patent No.: US 12,387,897 B2
(45) Date of Patent: Aug. 12, 2025

(54) CONTACT APPARATUS AND ELECTROMAGNETIC RELAY

(71) Applicant: Panasonic Intellectual Property Management Co., Ltd., Osaka (JP)

(72) Inventors: Yosuke Shimizu, Hokkaido (JP); Yuki Imaizumi, Hokkaido (JP); Tadahiro Yoshiura, Hokkaido (JP); Masahiro Ito, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 170 days.

(21) Appl. No.: 18/042,469

(22) PCT Filed: Oct. 4, 2021

(86) PCT No.: PCT/JP2021/036542
§ 371 (c)(1),
(2) Date: Feb. 22, 2023

(87) PCT Pub. No.: WO2022/123873
PCT Pub. Date: Jun. 16, 2022

(65) Prior Publication Data

US 2023/0326696 A1 Oct. 12, 2023

(30) Foreign Application Priority Data

Dec. 9, 2020 (JP) ................................ 2020-204458

(51) Int. Cl.
*H01H 50/54* (2006.01)

(52) U.S. Cl.
CPC .................................. *H01H 50/54* (2013.01)

(58) Field of Classification Search
CPC ...... H01H 50/54; H01H 50/38; H01H 50/546; H01H 9/443

(Continued)

(56) References Cited

U.S. PATENT DOCUMENTS 5,892,194 A * 4/1999 Uotome ............... H01H 51/065 335/154
2011/0032059 A1* 2/2011 Ito .......................... H01H 50/14 218/25

(Continued)

FOREIGN PATENT DOCUMENTS

CN 104718591 A 6/2015
JP 2019-096563 A 6/2019

(Continued)

OTHER PUBLICATIONS

The EPC Office Action dated Apr. 8, 2024 for the related European Patent Application No. 21902977.4.

(Continued)

*Primary Examiner* — Shawki S Ismail
*Assistant Examiner* — Lisa N Homza
(74) *Attorney, Agent, or Firm* — Rimon P.C.

(57) ABSTRACT

This contact apparatus includes: a fixed contact; a movable contactor including a movable contact facing the fixed contact; a magnetic shield configured to move in conjunction with the movable contactor and including a first shield portion, a second shield portion, and a joining portion joining the first shield portion and the second shield portion together; and a magnet having a first surface facing the fixed contact, the movable contact, and the first shield portion. The fixed contact, the movable contact, and the first shield portion are arranged in the following order: the fixed contact; the movable contact; and the first shield portion. The first shield portion includes a protrusion extending along the first surface of the magnet.

12 Claims, 8 Drawing Sheets

(58) Field of Classification Search
USPC .......................................................... 335/201
See application file for complete search history.

(56) References Cited

U.S. PATENT DOCUMENTS

| | | | | |
|---|---|---|---|---|
| 2016/0155592 | A1* | 6/2016 | Ito .......................... | H01H 50/36<br>335/187 |
| 2016/0260566 | A1* | 9/2016 | Shima .................... | H01H 50/54 |
| 2019/0035586 | A1 | 1/2019 | Ito et al. | |
| 2019/0355536 | A1* | 11/2019 | Ozaki .................... | H01H 9/443 |

FOREIGN PATENT DOCUMENTS

| | | |
|---|---|---|
| JP | 2020-064871 | 4/2020 |
| WO | 2014/087574 | 6/2014 |
| WO | 2022/091574 A1 | 5/2022 |

OTHER PUBLICATIONS

International Search Report of PCT application No. PCT/JP2021/036542 dated Dec. 7, 2021.

* cited by examiner

CONTACT APPARATUS AND ELECTROMAGNETIC RELAY

CROSS-REFERENCE TO RELATED APPLICATIONS

This application is a U.S. national stage application of the PCT International Application No. PCT/JP2021/036542 filed on Oct. 4, 2021, which claims the benefit of foreign priority of Japanese patent application No. 2020-204458 filed on Dec. 9, 2020, the contents all of which are incorporated herein by reference.

TECHNICAL FIELD

The present disclosure generally relates to contact apparatuses and electromagnetic relays and more particularly relates to a contact apparatus including at least one permanent magnet and an electromagnetic relay including said contact apparatus.

BACKGROUND ART

The contact device disclosed in Patent Literature (PTL) 1 includes a contact block, a driving block, and a yoke. The contact block includes a fixed contact and a movable contactor. The movable contactor includes a movable contact that comes into and out of contact with the fixed contact. The driving block includes a driving shaft that moves the movable contactor, and drives the driving shaft so that the movable contact comes into and out of contact with the fixed contact. The yoke is disposed on one side of the movable contactor in a driving direction and is fixed to the movable contactor.

CITATION LIST

Patent Literature

PTL 1: Unexamined Japanese Patent Publication No. 2020-064871

SUMMARY OF INVENTION

In a contact apparatus configured as described in PTL 1, there are cases where an electric arc is generated between the fixed contact and the movable contact when the fixed contact and the movable contact separate from each other.

A contact apparatus according to one aspect of the present disclosure includes: a first fixed contact; a movable contactor including a first movable contact facing the first fixed contact; a magnetic shield configured to move in conjunction with the movable contactor and including a first shield portion, a second shield portion, and a joining portion joining the first shield portion and the second shield portion together; and a first magnet having a first surface facing the first fixed contact, the first movable contact, and the first shield portion, wherein the first fixed contact, the first movable contact, and the first shield portion are arranged in the following order: the first fixed contact; the first movable contact; and the first shield portion, and the first shield portion includes a protrusion extending along the first surface of the first magnet.

An electromagnetic relay according to one aspect of the present disclosure includes: the contact apparatus according to the above aspect; and an electromagnet apparatus including a shaft and located below the contact apparatus, wherein the shaft moves in conjunction with the movable contactor, when the shaft moves upward, the first movable contact approaches the first fixed contact, and when the shaft moves downward, the first movable contact separates from the first fixed contact.

DESCRIPTION OF EMBODIMENTS

The following exemplary embodiments describe contact apparatuses and electromagnetic relays according to the present disclosure with reference to the drawings. Note that each of the following exemplary embodiments is merely a part of various exemplary embodiments of the present disclosure. Various changes can be made to each of the following exemplary embodiments according to the design or the like as long as the object of the present disclosure can be achieved. Furthermore, each figure described in the following exemplary embodiments is a schematic diagram, meaning that the ratio between the sizes of structural elements in each figure and the ratio between the thicknesses of structural elements in each figure do not necessarily reflect an actual dimension ratio.

Embodiment 1

[Outline]

Electromagnetic relay 1 (refer to FIG. 1) is provided in an electric vehicle, for example. Electromagnetic relay 1 switches between supplying and not supplying an electric current from a power supply to a motor in the electric vehicle, for example.

Figure 1:
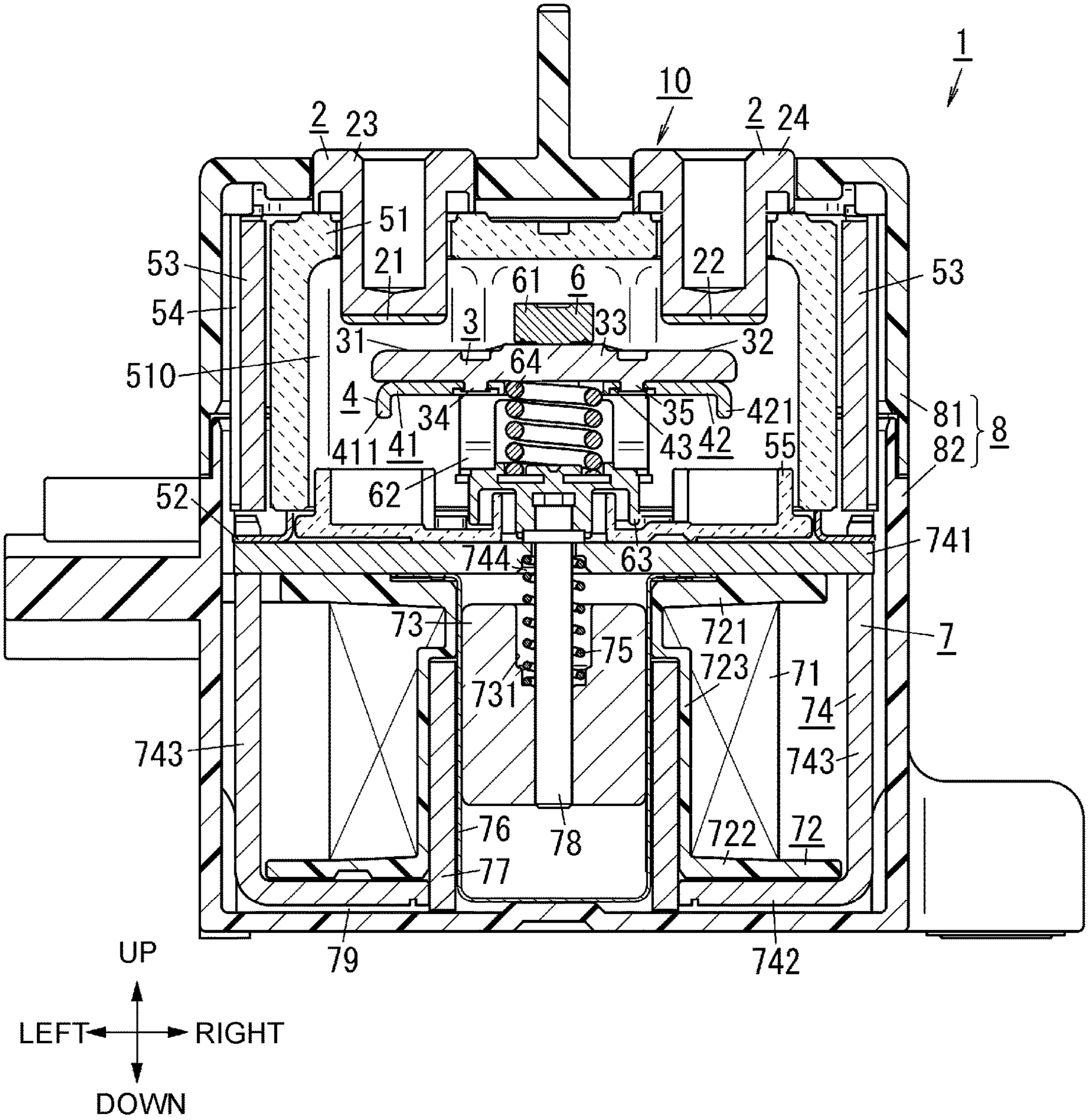
FIG. 1 is a front cross-sectional view of an electromagnetic relay according to Embodiment 1 with a coil unenergized.

As illustrated in FIG. 1, electromagnetic relay 1 includes contact apparatus 10 and electromagnet apparatus 7. Contact apparatus 10 includes: a pair of fixed contacts that are first fixed contact 21 and second fixed contact 22; movable contactor 3; at least one permanent magnet 53; and magnetic shield 4. Movable contactor 3 includes a pair of movable contacts 31, 32 that correspond to the pair of fixed contacts, respectively; and movable contactor body 33 that electrically connects the pair of movable contacts 31, 32. Movable contactor 3 can move between a closed position in which each of the pair of movable contacts 31, 32 is in contact with a corresponding one of the pair of fixed contacts and an open position in which each of the pair of movable contacts 31, 32 is separate from the corresponding one of the pair of fixed contacts. At least one permanent magnet 53 applies, to the space between movable contactor 3 and the pair of fixed contacts, a magnetic field extending in the horizontal direction in which the pair of movable contacts 31, 32 are arranged. Magnetic shield 4 includes first shield portion 41, second shield portion 42, and joining portion 43. First shield portion 41 overlaps at least a portion of first fixed contact 21 in the vertical direction in which movable contactor 3 moves and is disposed on a side of movable contactor 3 that is opposite the side on which first fixed contact 21 is disposed. Second shield portion 42 overlaps at least a portion of second fixed contact 22 in the vertical direction and is disposed on a side of movable contactor 3 that is opposite the side on which second fixed contact 22 is disposed. Joining portion 43 joins first shield portion 41 and second shield portion 42 together.

With the above-described configuration, end point E1 (refer to FIG. 5) of an electric arc is less likely to move on a surface (the lower surface) of movable contactor 3 that is located on magnetic shield 4 side, as compared to the case where magnetic shield 4 is not provided. Therefore, it is possible to reduce the likelihood that after the electric arc generated in the space between the fixed contact and movable contact 31 (32) is drawn to the outside of said space, end point E1 of the electric arc will move so as to make approximately one revolution around movable contactor 3. When end point E1 of the electric arc makes approximately one revolution around movable contactor 3, the distance between end point E1 and the fixed contact is shortened, and thus the electric arc may be transferred to the space between the fixed contact and movable contact 31 (32) and transition into a shorter electric arc; however, this is less likely to happen with the above-described configuration. In this manner, it is possible to reduce the likelihood that an electric arc will be repeatedly generated in the space between the fixed contact and movable contact 31 (32); therefore, time required to extinguish the electric arc can be reduced.

Hereinafter, a direction orthogonal to both the horizontal direction and the vertical direction is defined as a depth direction. Note that the "horizontal direction" in the present disclosure merely means a direction in which the pair of movable contacts 31, 32 are arranged. The "vertical direction" in the present disclosure merely means a direction in which movable contactor 3 moves. The "depth direction" in the present disclosure merely means a direction orthogonal to the direction in which the pair of movable contacts 31, 32 are arranged and the direction in which movable contactor 3 moves. The terms "horizontal direction", "vertical direction", and "depth direction" used in the present disclosure are not intended to limit the directions of contact apparatus 10 and electromagnetic relay 1 when in use.

The side on which the pair of movable contacts 31, 32 are located as viewed from first fixed contact 21 and second fixed contact 22 is defined as "down", and the side on which first fixed contact 21 and second fixed contact 22 are located as viewed from the pair of movable contacts 31, 32 is defined as "up". The side on which second fixed contact 22 is located as viewed from first fixed contact 21 is defined as "right", and the side on which first fixed contact 21 is located as viewed from second fixed contact 22 is defined as "left".

Each of the arrows representing left, right, up, down, front, and back in FIG. 1, etc., is indicated for explanation only and is not substantive.

In the present disclosure, although description is given using terms indicating directions such as "up", "down", "left", "right", "front", and "back", these merely indicate relative positioning and do not limit the present disclosure.

[Details]

(1) Structural Elements of Electromagnetic Relay

As illustrated in FIG. 1, electromagnetic relay 1 according to the present exemplary embodiment includes contact apparatus 10 and electromagnet apparatus 7. Electromagnet apparatus 7 performs at least one of the operation of switching the position of movable contactor 3 to the closed position and the operation of switching the position of movable contactor 3 to the open position. Electromagnet apparatus 7 according to the present exemplary embodiment includes coil 71 and when coil 71 is energized, switches the position of movable contactor 3 from the open position to the closed position by the electromagnetic action of coil 71. Furthermore, electromagnet apparatus 7 includes return spring 75 and when coil 71 enters into a non-energized state, switches the position of movable contactor 3 from the closed position to the open position by the elastic force of return spring 75.

Electromagnetic relay 1 further includes housing 8. Housing 8 accommodates contact apparatus 10 and electromagnet apparatus 7.

Housing 8 includes first body 81 and second body 82. First body 81 is formed in the shape of a box having a lower surface with an opening portion. Second body 82 is formed in the shape of a box having an upper surface with an opening portion. First body 81 and second body 82 are joined together at the edges of the respective opening portions thereof.

(2) Structural Elements of Contact Apparatus

As illustrated in FIG. 1, contact apparatus 10 includes a pair of fixed terminals 2, movable contactor 3, magnetic shield 4, case 51, joining body 52, two permanent magnets 53, two bridge parts 54 (refer to FIG. 3), blocking member 55, and holder 6.

(3) Fixed Terminal

The material of each of the pair of fixed terminals 2 is an electrically conductive material such as copper. Each fixed terminal 2 is disposed passing through first body 81 and case 51. Each fixed terminal 2 has an upper end protruding from the upper surface of case 51 and the upper surface of first body 81 when joined to case 51 by brazing.

One of the pair of fixed terminals 2 includes terminal body 23 and first fixed contact 21. The other of the pair of fixed terminals 2 includes terminal body 24 and second fixed contact 22. Each of terminal body 23, 24 is in the shape of a circular cylinder. First fixed contact 21 is attached to the lower end of terminal body 23. Note that first fixed contact 21 may be integrally formed with terminal body 23. Second fixed contact 22 is attached to the lower end of terminal body 24. Note that second fixed contact 22 may be integrally formed with terminal body 24.

(4) Movable Contactor

Figure 4:
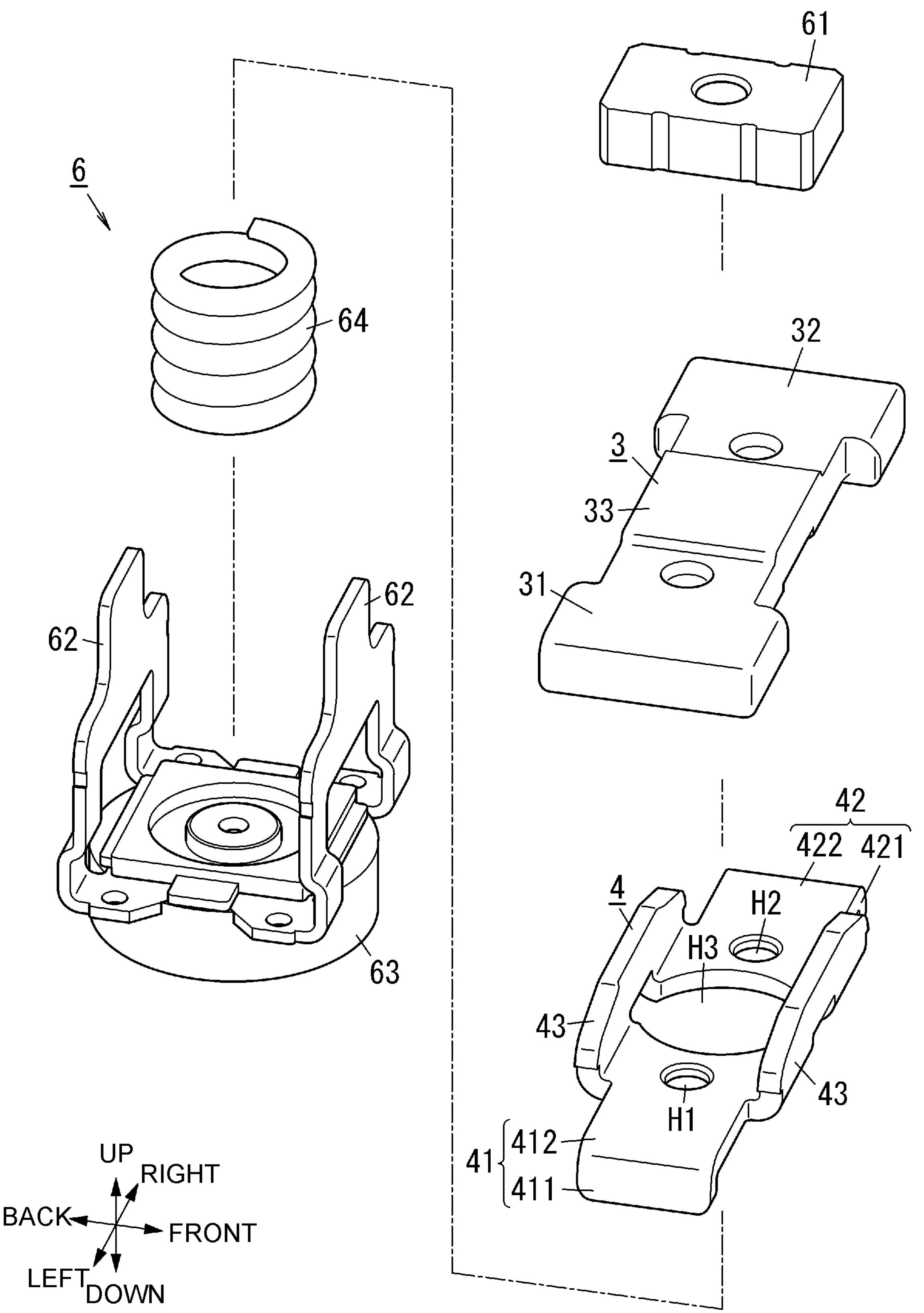
FIG. 4 is an exploded perspective view of main components of the electromagnetic relay.

The material of movable contactor 3 is an electrically conductive material such as copper. Furthermore, the material of movable contactor 3 is a non-magnetic material. As illustrated in FIG. 4, movable contactor 3 includes a pair of movable contacts 31, 32 and movable contactor body 33. Movable contactor body 33 is formed flat. The thickness direction of movable contactor body 33 is the vertical direction. The longitudinal direction of movable contactor body 33 is the horizontal direction.

Movable contact 31 is provided in a left end portion of the upper surface of movable contactor body 33. Movable contact 32 is provided in a right end portion of the upper surface of movable contactor body 33. Movable contact 31 faces first fixed contact 21. Movable contact 32 faces second fixed contact 22. In other words, movable contact 31 is located below first fixed contact 21, and movable contact 32 is located below second fixed contact 22. Each of movable contacts 31, 32 is a portion of the upper surface of movable contactor body 33.

In the present exemplary embodiment, movable contacts 31, 32 are integrated with movable contactor body 33, but movable contacts 31, 32 may be separate from movable contactor body 33.

Figure 2:
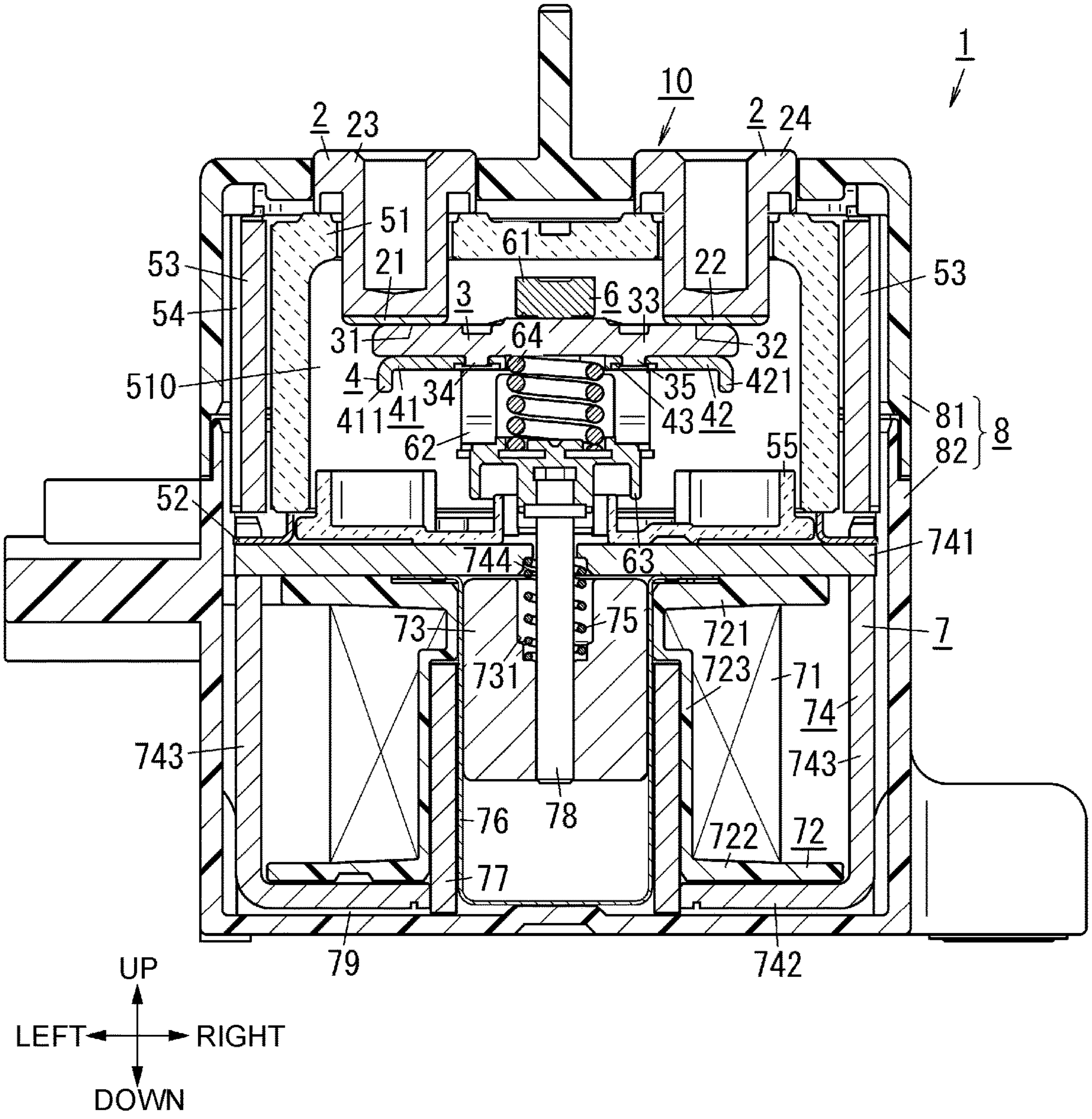
FIG. 2 is a front cross-sectional view of the electromagnetic relay with the coil energized.

When movable contactor 3 is in the open position (refer to FIG. 1), the pair of fixed terminals 2 do not conduct electricity therebetween. When movable contactor 3 is in the closed position (refer to FIG. 2), the pair of fixed terminals 2 conduct electricity therebetween via movable contactor 3.

As illustrated in FIG. 1, movable contactor 3 further includes first projection 34 and second projection 35 which protrude from the lower surface of movable contactor body 33.

(5) Magnetic Shield

The material of magnetic shield 4 is a magnetic material. One example of the magnetic material is electromagnetic soft iron or steel plate cold commercial (SPCC). The permeability of magnetic shield 4 is greater than the permeability of movable contactor 3.

As illustrated in FIG. 4, magnetic shield 4 includes first shield portion 41, second shield portion 42, and two joining portions 43.

First shield portion 41 includes protrusion 411 and main piece 412. Second shield portion 42 includes protrusion 421 and main piece 422. Each of main pieces 412, 422 is formed in the shape of a rectangular board. The thickness direction of main pieces 412, 422 is the vertical direction. The longitudinal direction of main pieces 412, 422 is the horizontal direction. Protrusion 411 is provided in a left end portion of main piece 412. Protrusion 411 protrudes downward from main piece 412. Protrusion 421 is provided in a right end portion of main piece 422. Protrusion 421 protrudes downward from main piece 422.

First shield portion 41 is disposed below movable contact 31. Second shield portion 42 is disposed below movable contact 32. First shield portion 41 has fitting hole H1. Second shield portion 42 has fitting hole H2. First projection 34 (refer to FIG. 1) of movable contactor 3 is inserted into fitting hole H1, and second projection 35 (refer to FIG. 1) of movable contactor 3 is inserted into fitting hole H2; thus, magnetic shield 4 is connected to movable contactor 3. In other words, magnetic shield 4 has a connecting structure (fitting holes H1, H2) for connection to movable contactor 3. Furthermore, movable contactor 3 has a connecting structure (first projection 34 and second projection 35) for connection to magnetic shield 4.

The aforementioned connecting structure of each of magnetic shield 4 and movable contactor 3 is more specifically a structure for connecting magnetic shield 4 and movable contactor 3 by swaging. Specifically, at least one of movable contactor 3 and magnetic shield 4 (in this example, magnetic shield 4) includes a depression (fitting holes H1, H2) into which at least a portion (first projection 34 and second projection 35) of the other (movable contactor 3) fits. The bottom of this depression is open.

Magnetic shield 4 is in contact with movable contactor 3. More specifically, the upper surface of first shield portion 41 and the upper surface of second shield portion 42 are in contact with the lower surface of movable contactor body 33.

Two joining portions 43 face each other in the depth direction. Two joining portions 43 are elongated in the horizontal direction. A left end portion of each of two joining portions 43 is connected to first shield portion 41, and a right end portion of each of two joining portions 43 is connected to second shield portion 42. One of two joining portions 43 is provided projecting upward from a front end portion of first shield portion 41 and a front end portion of second shield portion 42. The other of two joining portions 43 is provided projecting upward from a back end portion of first shield portion 41 and a back end portion of second shield portion 42.

Magnetic shield 4 has through-hole H3. Through-hole H3 is provided between first shield portion 41 and second shield portion 42.

Figure 5:
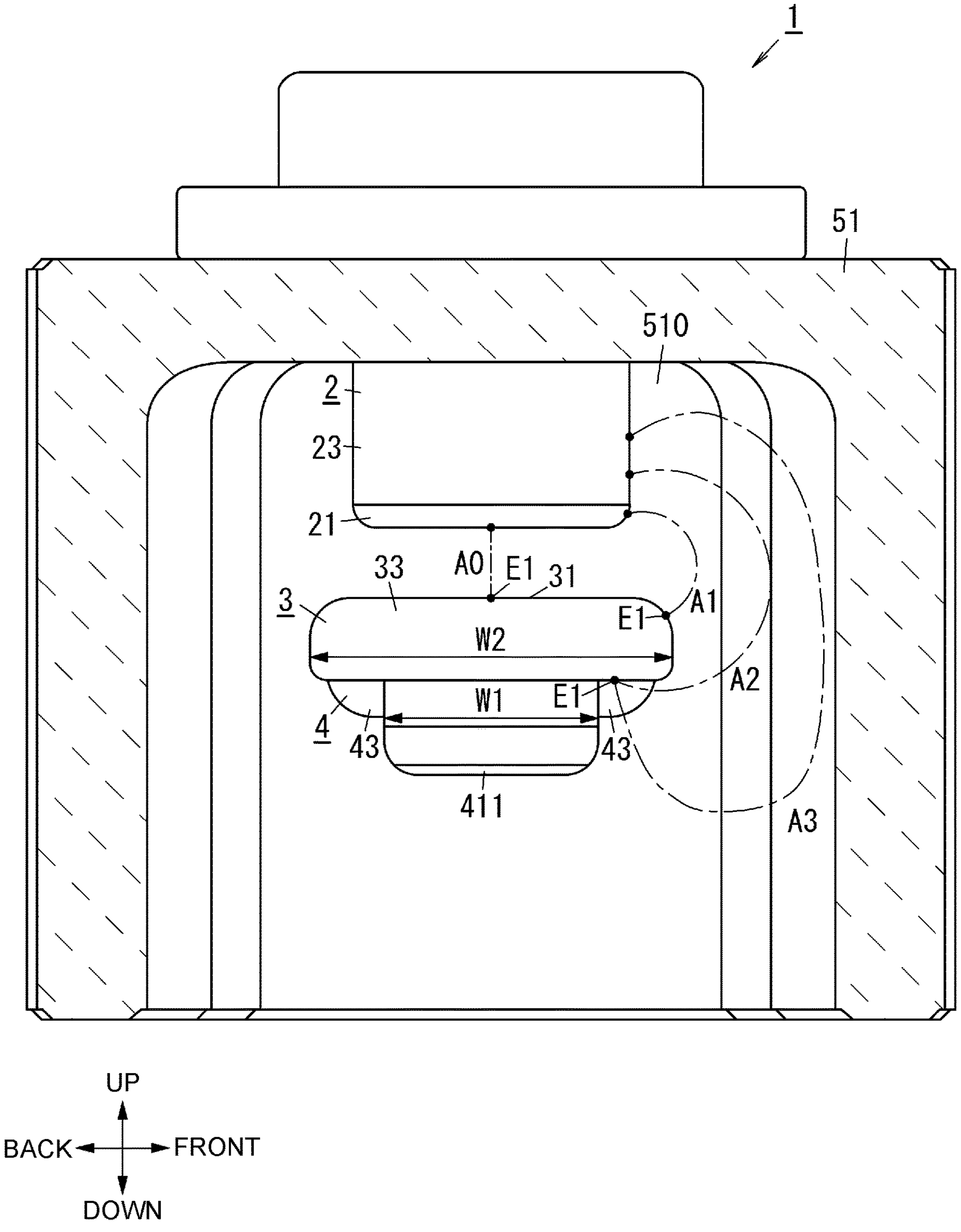
FIG. 5 is a side cross-sectional view of main components of the electromagnetic relay.

FIG. 5 is a side cross-sectional view of main components including fixed terminal 2, movable contactor 3, and magnetic shield 4 of electromagnetic relay 1. In the depth direction, width W1 (refer to FIG. 5) of main piece 412 of first shield portion 41 and the width (refer to FIG. 4) of main piece 422 of second shield portion 42 are equal. As illustrated in FIG. 5, in the depth direction, width W1 of main piece 412 of first shield portion 41 and the width of main piece 422 of second shield portion 42 are less than or equal to width W2 of an end portion of movable contactor 3. In the present exemplary embodiment, width W1 is less than width W2. The front end of main piece 412 of first shield portion 41 and the front end of main piece 422 of second shield portion 42 are located back of the front end of the end portion of movable contactor 3, and the back end of main piece 412 of first shield portion 41 and the back end of main piece 422 of second shield portion 42 are located forward of the back end of the end portion of movable contactor 3.

6) Holder (6) Holder

As illustrated in FIG. 1 and FIG. 4, holder 6 includes upper wall part 61, two side plates 62, spring bearing part 63, and contact pressure spring 64. Holder 6 holds movable contactor 3 and magnetic shield 4.

The material of upper wall part 61 is a magnetic material. One example of the magnetic material is electromagnetic soft iron or steel plate cold commercial (SPCC). Upper wall part 61 is in the shape of a rectangular cuboid.

The material of two side plates 62 is, for example, a metal. The material of spring bearing part 63 is, for example, a synthetic resin. Two side plates 62 and spring bearing part 63 are integrally formed. Two side plates 62 protrude upward from spring bearing part 63. Two side plates 62 face each other in the depth direction. Upper wall part 61 connect upper end portions of two side plates 62. Movable contactor 3 extends between upper wall part 61 and spring bearing part 63.

Contact pressure spring 64 is, for example, a helical compression spring. Contact pressure spring 64 is inserted into through-hole H3 of magnetic shield 4. Compression pressure spring 64 is disposed between spring bearing part 63 and movable contactor 3 so as to be extended and retracted in the vertical direction. Movable contactor 3 is sandwiched between contact pressure spring 64 and upper wall part 61. Contact pressure spring 64 applies an upward elastic force to movable contactor 3.

When an electric current flows through movable contactor 3 and the pair of fixed contacts (first fixed contact 21 and second fixed contact 22) at the time of contact thereof, an electromagnetic repulsive force acts between movable contactor 3 and the pair of fixed contacts due to this electric current.

Upper wall part 61 faces two joining portions 43 of magnetic shield 4. Thus, with upper wall part 61 and magnetic shield 4, a magnetic circuit that surrounds movable contactor 3 is formed. When an electric current flows through movable contacts 31, 32 and the pair of fixed contacts at the time of contact thereof, a magnetic attractive force is generated between upper wall part 61 and magnetic shield 4. This restricts the operation of movable contactor 3 separating from the pair of fixed contacts. Thus, it is possible to reduce the likelihood that an electric arc will be generated between movable contactor 3 and the pair of fixed contacts.

(7) Case

Next, case 51 will be described with reference to FIG. 1. The material of case 51 is a heat-resistant material such as a ceramic. Case 51 is in the shape of a box with an open bottom. The internal space of case 51 is housing chamber 510 which accommodates first fixed contact 21, second fixed contact 22, and movable contactor 3. In other words, contact apparatus 10 includes housing chamber 510. Housing chamber 510 contains an arc-extinguishing gas such as hydrogen. Note that housing chamber 510 does not need to be sealed and may be connected to the external environment.

(8) Joining Body

Joining body 52 is in the shape of a rectangular frame. Joining body 52 is joined to case 51 by brazing. Furthermore, joining body 52 is welded to yoke 74 included in electromagnet apparatus 7. Thus, joining body 52 joins case 51 and yoke 74 together.

(9) Two Permanent Magnets

Two permanent magnets 53 are disposed and fixed between the outer surface of case 51 and the inner surface of housing 8. Two permanent magnets 53 are arranged in the horizontal direction. One of two permanent magnets 53 is positioned to the left of movable contactor 3, and the other is positioned to the right of movable contactor 3. Two permanent magnets 53 overlap at least a portion of magnetic shield 4 in the horizontal direction.

Different poles of two permanent magnets 53 face each other. For example, the north pole of permanent magnet 53 on the left side is directed to the right, and the south pole of permanent magnet 53 on the right side is directed to the left. Two permanent magnets 53 apply, to the space between movable contactor 3 and first fixed contact 21 and the space between movable contactor 3 and second fixed contact 22, a magnetic field extending in the horizontal direction. Furthermore, the magnetic field also extends around movable contactor 3 (for example, downward of movable contactor 3).

The upper ends of two permanent magnets 53 are aligned with the upper end of case 51 in the horizontal direction. The lower ends of two permanent magnets 53 are aligned with the lower end of case 51 in the horizontal direction.

(10) Two Bridge Parts

Figure 3:
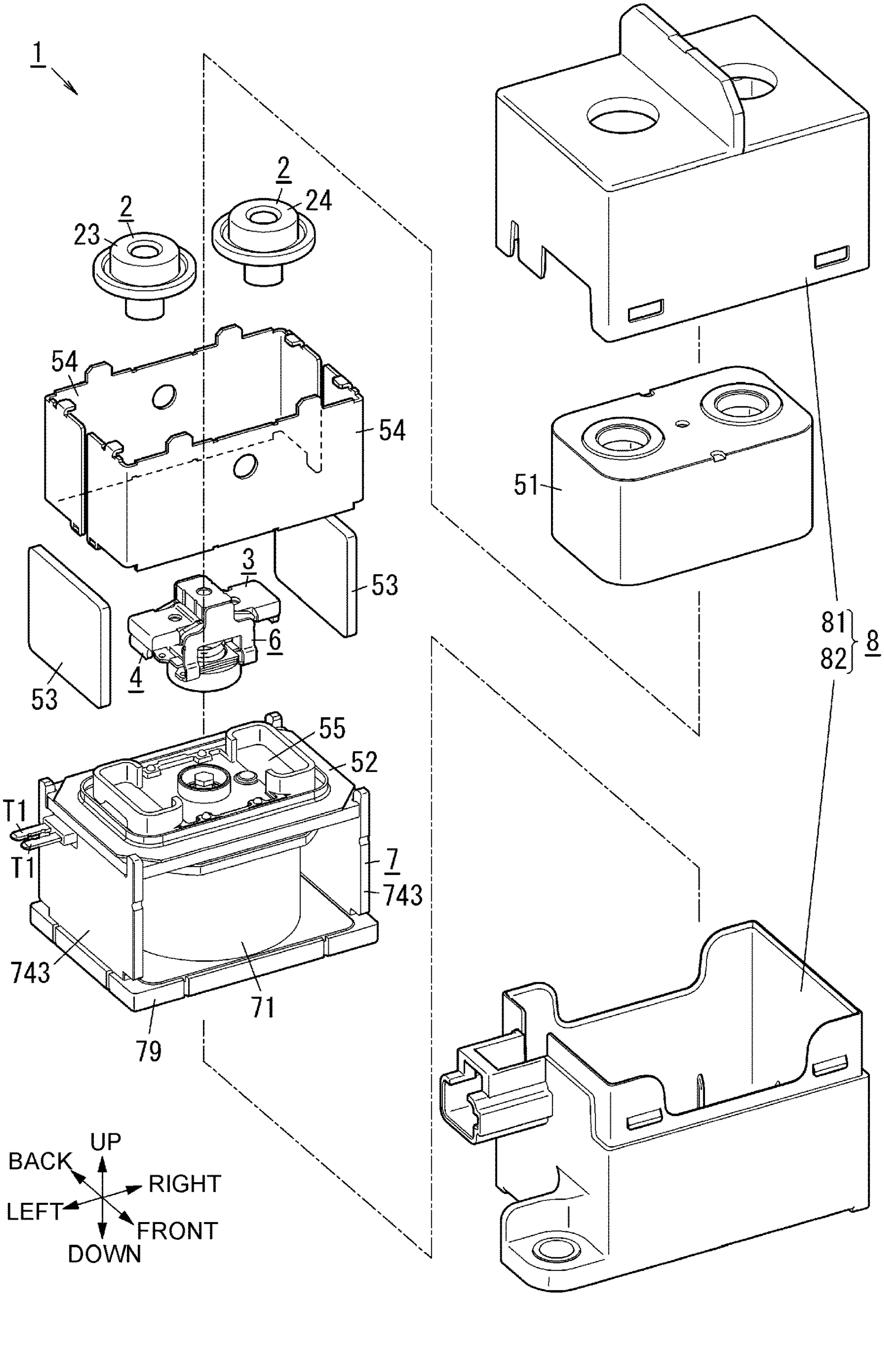
FIG. 3 is an exploded perspective view of the electromagnetic relay.

Next, two bridge parts 54 will be described with reference to FIG. 1 and FIG. 3. The material of two bridge parts 54 is a magnetic material. Each bridge part 54 is in the "U" shape as viewed in the vertical direction. One of two bridge parts 54 is positioned in front of movable contactor 3, and the other is positioned behind movable contactor 3. Two bridge parts 54 are disposed so as to bridge the space between two permanent magnets 53. Furthermore, two bridge parts 54 hold two permanent magnets 53. Two bridge parts 54 form a ring-shaped magnetic circuit with two permanent magnets 53.

The upper ends of two bridge parts 54 are aligned with the upper end of case 51 in the horizontal direction. The lower ends of two bridge parts 54 are aligned with the lower end of case 51 in the horizontal direction.

(11) Blocking Member

Blocking member 55 has electrical insulating properties. The material of blocking member 55 is, for example, a ceramic or a synthetic resin. Blocking member 55 is housed in housing chamber 510.

In contact apparatus 10, there are cases where an electric arc is generated between movable contacts 31, 32 and the pair of fixed contacts when movable contactor 3 moves from the closed position to the open position. Providing blocking member 55 results in restricting the range where the electric arc extends.

(12) Electromagnet Apparatus

As illustrated in FIG. 1, electromagnet apparatus 7 includes coil 71, coil bobbin 72, movable core 73, yoke 74, return spring 75, cylindrical member 76, bush 77, shaft 78, and bottom wall part 79. Furthermore, electromagnet apparatus 7 includes a pair of coil terminals T1 (refer to FIG. 3) to which both ends of coil 71 are connected. The material of each coil terminal T1 is an electrically conductive material such as copper.

The material of coil bobbin 72 is, for example, a synthetic resin. Coil bobbin 72 includes two flange portions 721, 722 and cylindrical portion 723. Coil 71 is wound around cylindrical portion 723. Flange portion 721 extends from the upper end of cylindrical portion 723 outward in the radial direction of cylindrical portion 723. Flange portion 722 extends from the lower end of cylindrical portion 723 outward in the radial direction of cylindrical portion 723.

Cylindrical member 76 is in the shape of a bottomed cylinder with an open top end. Cylindrical member 76 is housed in cylindrical portion 723 of coil bobbin 72.

The material of movable core 73 is a magnetic material. Movable core 73 is in the shape of a cylinder. Movable core 73 is housed in cylindrical member 76. Shaft 78 extends through the inside of movable core 73, and movable core 73 and shaft 78 are connected. Movable core 73 includes recess 731 depressed downward from the upper surface of movable core 73.

Yoke 74 forms at least a portion of the magnetic circuit that allows passage of the magnetic flux generated at coil 71 when coil 71 is energized. Yoke 74 includes first yoke 741, second yoke 742, and two third yokes 743. Each of first yoke 741, second yoke 742, and two third yokes 743 is formed in the shape of a board.

First yoke 741 is disposed between movable contactor 3 and coil 71. First yoke 741 is in contact with the upper surface of coil bobbin 72. First yoke 741 is in the shape of a rectangular board. First yoke 741 has insertion hole 744 in a central portion. Shaft 78 extends through insertion hole 744.

Second yoke 742 is in contact with the lower surface of coil bobbin 72. One of two third yokes 743 extends from the left end of second yoke 742 to first yoke 741. The other of two third yokes 743 extends from the right end of second yoke 742 to first yoke 741.

Return spring 75 is, for example, a helical compression spring. A first end of return spring 75 in the stretching direction (the vertical direction) is in contact with first yoke 741, and a second end of return spring 75 in the stretching direction (the vertical direction) is in contact with the bottom surface of recess 731 of movable core 73. Return spring 75 applies an elastic force to movable core 73 to move movable core 73 downward.

Shaft 78 is in the shape of a round rod. The axial direction of shaft 78 is the vertical direction. The upper end of shaft 78 is connected to holder 6. The lower end of shaft 78 is connected to movable core 73. When movable core 73 moves in the vertical direction, shaft 78, holder 6, and movable contactor 3 held by holder 6 move together in the vertical direction.

Bottom wall part 79 is in the shape of a rectangular board. Bottom wall part 79 is disposed below second yoke 742. Bottom wall part 79 holds second yoke 742.

Bush 77 is formed of a magnetic material. Bush 77 is in the shape of a cylinder. Bush 77 is disposed between the inner peripheral surface of coil bobbin 72 and the other peripheral surface of cylindrical member 76. Together with movable core 73 and yoke 74, bush 77 forms a magnetic circuit that allows passage of the magnetic flux generated when coil 71 is energized.

When coil 71 is energized, the magnetic flux generated at coil 71 passes through the aforementioned magnetic circuit, and thus movable core 73 moves so that the magnetic resistance of the aforementioned magnetic circuit is reduced. Specifically, during energization of coil 71, movable core 73 moves upward so as to fill the gap between first yoke 741 and movable core 73. More specifically, an electromagnetic force that is exerted to move movable core 73 upward exceeds the force (elastic force) of return spring 75 that pushes movable core 73 downward; thus, movable core 73 moves upward. Accordingly, shaft 78, holder 6, and movable contactor 3 move upward. Thus, movable contactor 3 moves to the closed position (refer to FIG. 2). The elastic force of contact pressure spring 64 ensures the contact pressure between movable contactor 3 and each of first fixed contact 21 and second fixed contact 22.

When coil 71 changes from the energized state into the de-energized state, there is no longer the electromagnetic force that moves movable core 73 upward, and thus movable core 73 moves downward with the elastic force of return spring 75. Accordingly, shaft 78, holder 6, and movable contactor 3 move downward. Thus, movable contactor 3 moves to the open position (refer to FIG. 1).

(13) Behavior of Electric Arc

There are cases where an electric arc is generated between the pair of movable contacts 31, 32 and the pair of fixed contacts (first fixed contact 21 and second fixed contact 22) when movable contactor 3 moves from the closed position to the open state. Hereinafter, one example of the behavior of the electric arc generated between movable contact 31 and first fixed contact 21 will be described. The behavior of the electric arc generated between movable contact 32 and second fixed contact 22 may be substantially the same as the behavior described below.

Figure 6:
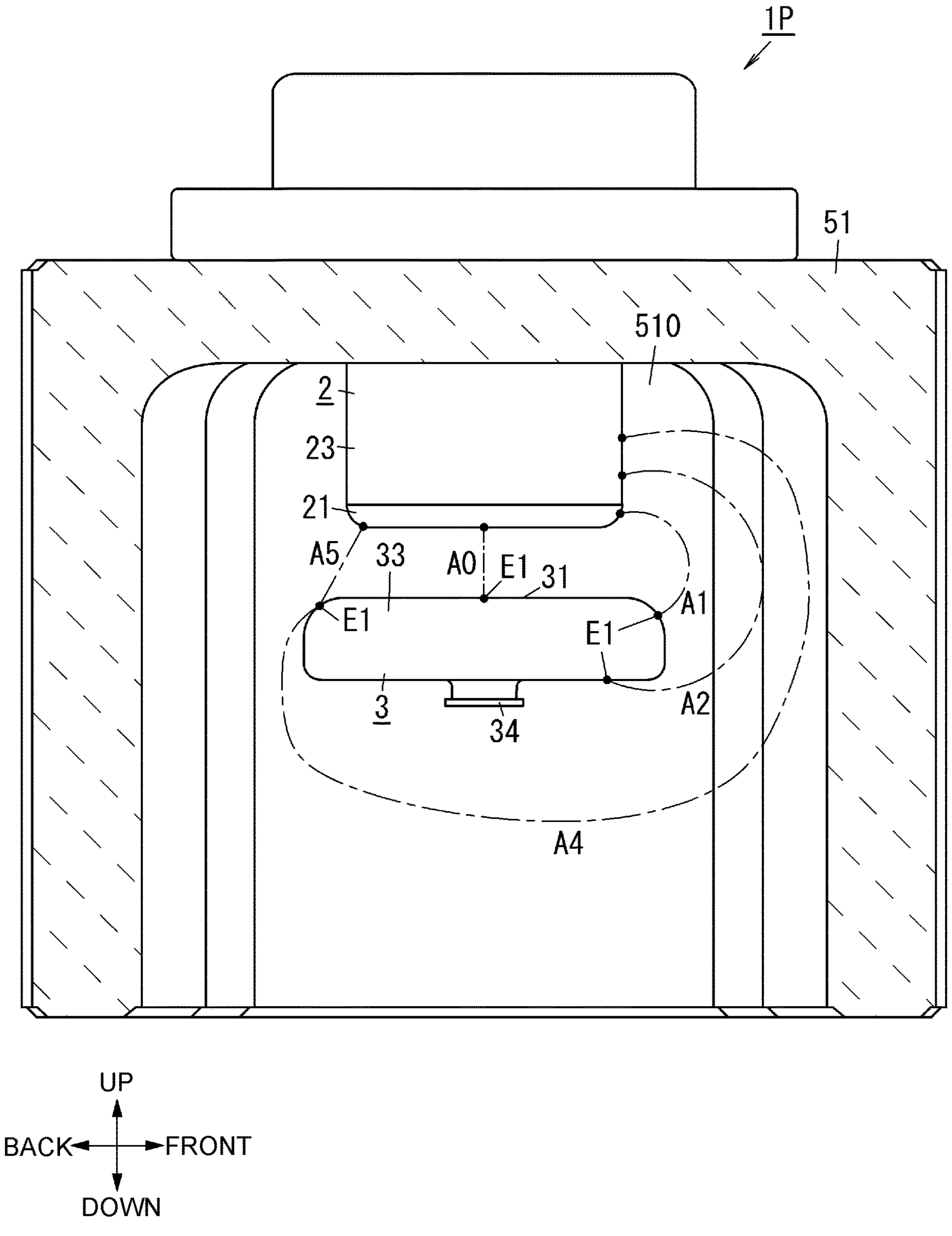
FIG. 6 is a side cross-sectional view of main components of an electromagnetic relay according to a comparative example.

FIG. 5 illustrates main components of electromagnetic relay 1 according to the present exemplary embodiment. FIG. 6 illustrates main components of electromagnetic relay 1P according to a comparative example. In FIG. 5 and FIG. 6, illustrations of some of the elements of electromagnetic relays 1, 1P (for example, holder 6 and housing 8) are omitted.

Electromagnetic relay 1P according to the comparative example is different from electromagnetic relay 1 according to the present exemplary embodiment in that magnetic shield 4 is not provided, but the other configuration of electromagnetic relay 1P is the same as that of electromagnetic relay 1. In FIG. 5 and FIG. 6, each of dashed-dotted lines A0 to A5 virtually represents the electric arc generated between movable contact 31 and first fixed contact 21. The electric arc is drawn in the internal space (housing chamber 510) of case 51.

Two permanent magnets 53 (refer to FIG. 1) apply, to the space between movable contact 31 and first fixed contact 21 and an area surrounding said space, a magnetic field extending in the horizontal direction. As indicated by dashed-dotted line A0 (refer to FIG. 5 and FIG. 6), when an electric arc is generated between movable contact 31 and first fixed contact 21, the electric arc is drawn with the Lorentz force while two end points of the electric arc moves. For example, as indicated by dashed-dotted line A1 (refer to FIG. 5 and FIG. 6), end point E1 of the electric arc that is located on movable contactor 3 side, out of the two end points of the electric arc, moves toward the front end of movable contactor body 33. Subsequently, for example, as indicated by dashed-dotted line A2 (refer to FIG. 5 and FIG. 6), end point E1 of the electric arc that is located on movable contactor 3 side, out of the two end points of the electric arc, moves around to an area located on the lower surface of movable contactor body 33.

Here, in the case where magnetic shield 4 is not provided, end point E1 of the electric arc may further move on the surface of movable contactor 3. For example, as indicated by dashed-dotted line A4 (refer to FIG. 6), end point E1 of the electric arc may move so as to make approximately one revolution around movable contactor 3 and reach the upper surface of movable contactor 3. In this manner, when end point E1 of the electric arc approaches first fixed contact 21, the electric arc may transition into a shorter electric arc connecting first fixed contact 21 and movable contactor 3. For example, there are cases where the electric arc transitions into an electric arc linearly connecting first fixed contact 21 and movable contactor 3, as indicated by dashed-dotted line A5 (refer to FIG. 6). When a relatively short electric arc is generated in this manner, the voltage of the electric arc may be reduced or time required to extinguish the electric arc may be increased, for example, meaning that the arc-extinguishing performance of electromagnetic relay 1P may be degraded.

In contrast, when there is magnetic shield 4 as in the present exemplary embodiment, it is possible to reduce the likelihood that on the surface of movable contactor 3, end point E1 of the electric arc will move beyond magnetic shield 4, as indicated by dashed-dotted line A3 (refer to FIG. 5). Specifically, in a region where magnetic shield 4 is provided out of a region located below movable contactor 3, the magnetic field of two permanent magnets 53 (refer to FIG. 1) passes through the magnetic circuit formed by magnetic shield 4. Therefore, in the region where magnetic shield 4 is provided, it is possible to reduce the likelihood that the Lorentz force will act on the electric arc. Thus, it is possible to reduce the likelihood that end point E1 of the electric arc will move on the lower surface of movable contactor 3.

Thus, as indicated by dashed-dotted line A3 (refer to FIG. 5), the electric arc is drawn while barely moving end point E1 after reaching the lower surface of movable contactor 3. This means that it is possible to draw and extinguish the electric arc while reducing the likelihood that the electric arc will be transferred.

In magnetic shield 4, a magnetic circuit extending from first shield portion 41 to second shield portion 42 via joining portion 43 is formed. Furthermore, first shield portion 41 includes protrusion 411, and second shield portion 42 includes protrusion 421. Therefore, as compared to the case where protrusions 411, 421 are not provided, the surface area of magnetic shield 4 is large, meaning that the magnetic field applied by two permanent magnets 53 is likely to pass through the magnetic circuit formed by magnetic shield 4. Thus, the magnetic field applied by two permanent magnets 53 makes it possible to reduce the likelihood that end point E1 of the electric arc will move.

The direction of the magnetic field applied by at least one permanent magnet (in the present exemplary embodiment, two permanent magnets) 53 (hereinafter referred to as "the direction of application") between movable contactor 3 and the pair of fixed contacts (first fixed contact 21 and second fixed contact 22) is the horizontal direction. The area of protrusion 411 in the cross-section orthogonal to the direction of application is greater than the area of protrusion 411 in the cross-section extending along both the direction of application and the vertical direction (the cross-section orthogonal to the depth direction). The area of protrusion 421 in the cross-section orthogonal to the direction of application is greater than the area of protrusion 421 in the cross-section extending along both the direction of application and the vertical direction. Since the area of each of protrusions 411, 421 in the cross-section orthogonal to the direction of application is relatively large as just mentioned, the magnetic field applied by two permanent magnets 53 is likely to pass through the magnetic circuit formed by magnetic shield 4.

Variations of Embodiment 1

Hereinafter, variations of Embodiment 1 will be listed. The following variations may be implemented in appropriate combinations.

Magnetic shield 4 may include only one of protrusion 411 and protrusion 421. In other words, at least one of first shield portion 41 and second shield portion 42 may include protrusion 411 (or 421) protruding away from the side on which movable contactor 3 is disposed. Furthermore, magnetic shield 4 does not need to include any of protrusion 411 and protrusion 421.

When magnetic shield 4 includes only one of protrusion 411 and protrusion 421 and when magnetic shield 4 does not include any of protrusion 411 and protrusion 421, it is preferable that magnetic shield 4 be thick enough in the vertical direction. This is advantageous in that the magnetic field produced by two permanent magnets 53 is likely to pass through magnetic shield 4. The thickness of magnetic shield 4 in the vertical direction is preferably at least half of the thickness of movable contactor 3 in the vertical direction, for example. The thickness of magnetic shield 4 in the vertical direction is more preferably at least one time as great as the thickness of movable contactor 3 in the vertical direction.

Instead of being arranged in the horizontal direction, two permanent magnets 53 may be arranged in the depth direction. Two permanent magnets 53 arranged in the depth direction may have the same poles facing each other and thus apply, to the space between movable contactor 3 and the pair of fixed contacts (first fixed contact 21 and second fixed contact 22), a magnetic field extending in the horizontal direction.

The number of permanent magnets 53 is not limited to two and may be one or may be three or more.

Movable contactor 3 may include a depression into which at least a portion of magnetic shield 4 fits.

Embodiment 2

Figure 7:
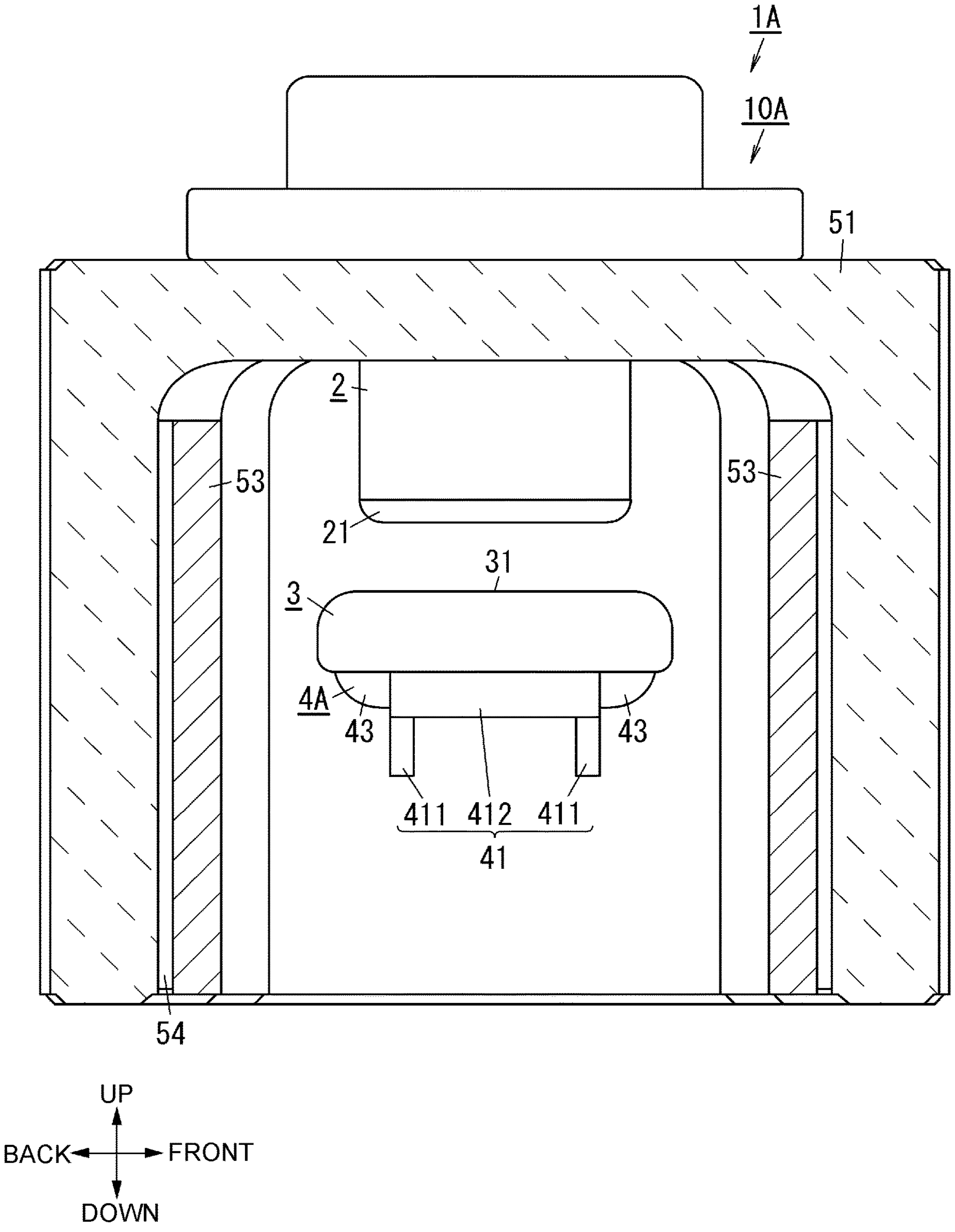
FIG. 7 is a side cross-sectional view of main components of an electromagnetic relay according to Embodiment 2.
Figure 8:
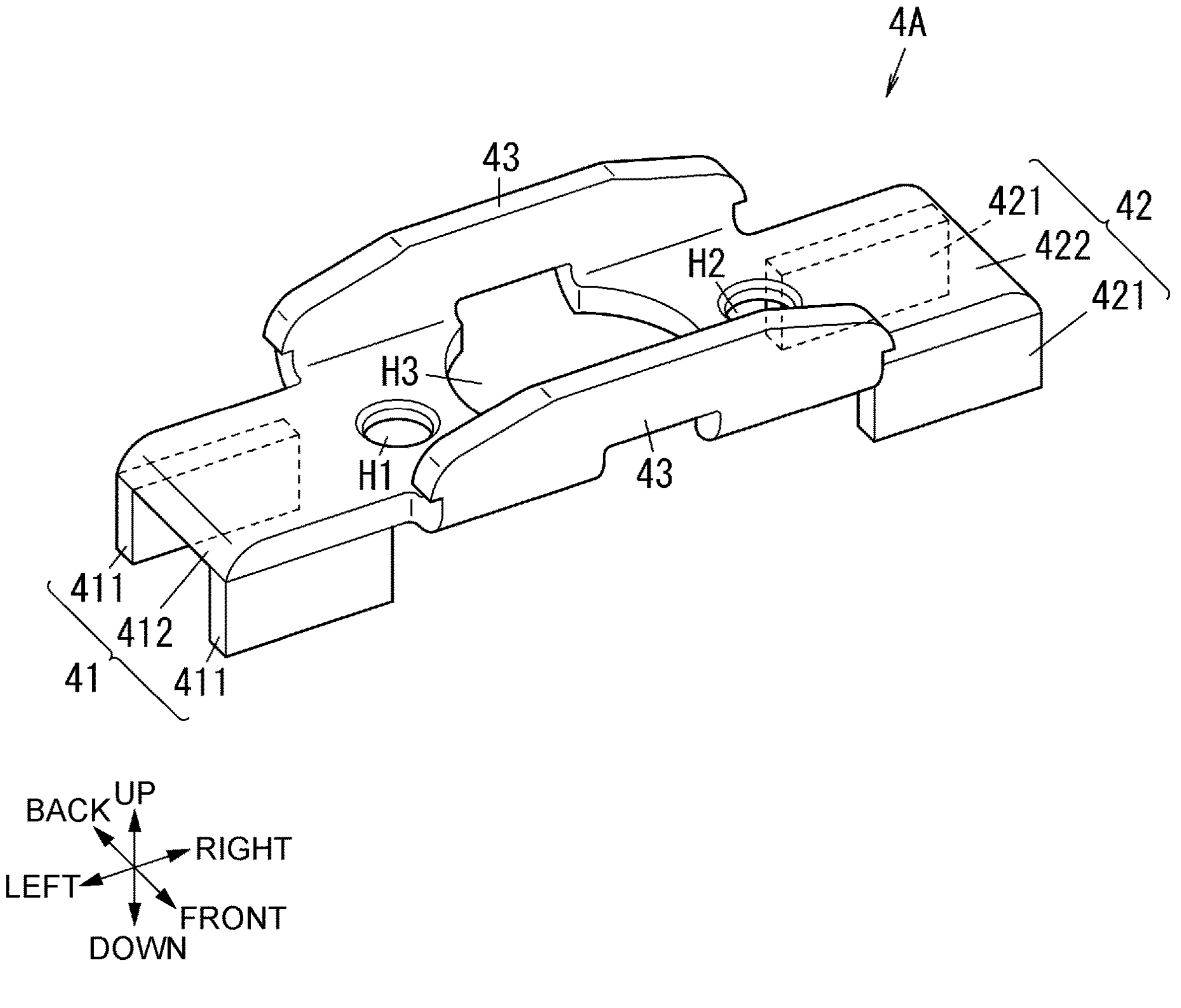
FIG. 8 is a perspective view of a magnetic shield of the electromagnetic relay.

Hereinafter, electromagnetic relay 1A and contact apparatus 10A according to Embodiment 2 will be described with reference to FIG. 7 and FIG. 8. Elements that are substantially the same as those in Embodiment 1 are assigned the same reference marks, and descriptions of the elements will be omitted. In FIG. 7, illustrations of some of the elements of electromagnetic relay 1A (for example, holder 6 and housing 8) are omitted.

In contact apparatus 10A according to the present exemplary embodiment, the direction of the magnetic field that two permanent magnets 53 apply to the space between movable contactor 3 and the pair of fixed contacts is the depth direction. In order to provide such a magnetic field, two permanent magnets 53 are arranged in front of and behind movable contactor 3 and have different poles facing each other. Two permanent magnets 53 overlap at least a portion of magnetic shield 4A in the depth direction.

Furthermore, the shape of magnetic shield 4A according to the present exemplary embodiment is different from the shape of magnetic shield 4 according to Embodiment 1. In magnetic shield 4A, first shield portion 41 includes two protrusions 411 and main piece 412. One of two protrusions 411 is provided at a front end portion of main piece 412. The other of two protrusions 411 is provided at a back end portion of main piece 412. Each protrusion 411 protrudes downward from main piece 412. The configuration of main piece 412 is substantially the same as that in Embodiment 1.

Second shield portion 42 includes two protrusions 421 and main piece 422. One of two protrusions 421 is provided at a front end portion of main piece 422. The other of two protrusions 421 is provided at a back end portion of main piece 422. Each protrusion 421 protrudes downward from main piece 422. The configuration of main piece 422 is substantially the same as that in Embodiment 1.

In first shield portion 41, a magnetic circuit extending from the front surface to the back surface of first shield portion 41 is formed. In other words, a magnetic circuit extending from one of two protrusions 411 to the other is formed. As compared to the case where protrusion 411 is not provided, the surface area of first shield portion 41 is large, meaning that the magnetic field applied by two permanent magnets 53 is likely to pass through the magnetic circuit formed by first shield portion 41.

In second shield portion 42, a magnetic circuit extending from the front surface to the back surface of second shield portion 42 is formed. In other words, a magnetic circuit extending from one of two protrusions 421 to the other is formed. As compared to the case where protrusion 421 is not provided, the surface area of second shield portion 42 is large, meaning that the magnetic field applied by two permanent magnets 53 is likely to pass through the magnetic circuit formed by second shield portion 42.

The direction of the magnetic field applied by at least one permanent magnet (in the present exemplary embodiment, two permanent magnets) 53 (hereinafter referred to as "the direction of application") between movable contactor 3 and the pair of fixed contacts (first fixed contact 21 and second fixed contact 22) is the depth direction. The area of protrusion 411 in the cross-section orthogonal to the direction of application is greater than the area of protrusion 411 in the cross-section extending along both the direction of application and the vertical direction (the cross-section orthogonal to the horizontal direction). The area of protrusion 421 in the cross-section orthogonal to the direction of application is greater than the area of protrusion 421 in the cross-section extending along both the direction of application and the vertical direction. Since the area of each of protrusions 411, 421 in the cross-section orthogonal to the direction of application is relatively large as just mentioned, the magnetic field applied by two permanent magnets 53 is likely to pass through the magnetic circuit formed by each of first shield portion 41 and second shield portion 42.

As can be appreciated from the foregoing, contact apparatus 10A according to Embodiment 2 includes the following elements. Contact apparatus 10A includes: a pair of fixed contacts that are first fixed contact 21 and second fixed contact 22; movable contactor 3; at least one permanent magnet 53; and magnetic shield 4A. Movable contactor 3 includes: a pair of movable contacts 31, 32 that correspond one-to-one with the pair of fixed contacts; and movable contactor body 33 that electrically connects the pair of movable contacts 31, 32. Movable contactor 3 can move between the closed position in which each of the pair of movable contacts 31, 32 is in contact with the corresponding one of the pair of fixed contacts and the open position in which each of the pair of movable contacts 31, 32 is separate from the corresponding one of the pair of fixed contacts. At least one permanent magnet 53 applies, to the space between movable contactor 3 and the pair of fixed contacts, a magnetic field extending in the depth direction. The depth direction is orthogonal to both the horizontal direction in which the pair of movable contacts 31, 32 are arranged and the vertical direction in which movable contactor 3 moves. Magnetic shield 4A includes first shield portion 41 and second shield portion 42. First shield portion 41 overlaps at least a portion of first fixed contact 21 in the vertical direction and is disposed on the side of movable contactor 3 that is opposite the side on which first fixed contact 21 is disposed. Second shield portion 42 overlaps at least a portion of second fixed contact 22 in the vertical direction and is disposed on the side of movable contactor 3 that is opposite the side on which second fixed contact 22 is disposed.

[Variations of Embodiment 2]

Hereinafter, variations of Embodiment 2 will be listed. The following variations may be implemented in appropriate combinations.

Magnetic shield 4A does not need to include joining portions 43. In other words, first shield portion 41 and second shield portion 42 do not need to be connected via joining portions 43.

The number of protrusions 411 of first shield portion 41 may be one or may be three or more. No protrusions 411 may be included in first shield portion 41.

The number of protrusions 421 of second shield portion 42 may be one or may be three or more. No protrusions 421 may be included in second shield portion 42.

When first shield portion 41 (or second shield portion 42) includes no protrusion 411 (or 421) and when first shield portion 41 (or second shield portion 42) includes only one protrusion 411 (or 421), it is preferable that first shield portion 41 (or second shield portion 42) be thick enough in the vertical direction. This is advantageous in that the magnetic field produced by two permanent magnets 53 is likely to pass through first shield portion 41 (or second shield portion 42). The thickness of first shield portion 41 (or second shield portion 42) in the vertical direction is preferably at least half of the thickness of movable contactor 3 in the vertical direction, for example. The thickness of first shield portion 41 (or second shield portion 42) in the vertical direction is more preferably at least one time as great as the thickness of movable contactor 3 in the vertical direction.

Instead of being arranged in the depth direction, two permanent magnets 53 may be arranged in the horizontal direction. Two permanent magnets 53 arranged in the horizontal direction may have the same poles facing each other and thus apply, to the space between movable contactor 3 and the pair of fixed contacts (first fixed contact 21 and second fixed contact 22), a magnetic field extending in the depth direction.

The number of permanent magnets 53 is not limited to two and may be one or may be three or more.

Movable contactor 3 may include a depression into which at least a portion of magnetic shield 4A fits.

SUMMARY

According to the exemplary embodiments, etc., described above, the following aspects are disclosed.

Contact apparatus 10 (10A) according to the first aspect includes: first fixed contact 21; movable contactor 3 including movable contact 31 facing first fixed contact 21; magnetic shield 4 (4A) configured to move in conjunction with movable contactor 3 and including first shield portion 41, second shield portion 42, and joining portion 43 joining first shield portion 41 and second shield portion 42 together; and a magnet (permanent magnet 53 on the left side in FIG. 1) having a first surface facing first fixed contact 21, movable contact 31, and first shield portion 41, wherein first fixed contact 21, movable contact 31, and first shield portion 41 are arranged in the following order: first fixed contact 21; movable contact 31; and first shield portion 41, and first shield portion 41 includes protrusion 411 extending along the first surface of permanent magnet 53 (corresponding to the right side surface of permanent magnet 53 on the left side).

With the above-described configuration, as compared to the case where magnetic shield 4 (4A) is not provided, end point E1 of the electric arc is less likely to move on the surface of movable contactor 3 that faces magnetic shield 4 (4A). Therefore, it is possible to reduce the likelihood that after the electric arc generated in the space between first fixed contact 21 and movable contact 31 is drawn to the outside of said space, end point E1 of the electric arc will move so as to make approximately one revolution around movable contactor 3. When end point E1 of the electric arc makes approximately one revolution around movable contactor 3, the electric arc may be transferred to the space between first fixed contact 21 and movable contact 31 and transition into a shorter electric arc; however, this is less likely to happen with the above-described configuration. In this manner, it is possible to reduce the likelihood that an electric arc will be repeatedly generated in the space between first fixed contact 21 and movable contact 31; therefore, time required to extinguish the electric arc can be reduced.

Furthermore, with the above-described configuration, as compared to the case where protrusion 411 is not provided, the area of a surface of magnetic shield 4 (4A) that faces permanent magnet 53 is large, meaning that the magnetic field of permanent magnet 53 is likely to pass through the magnetic circuit formed by magnetic shield 4 (4A).

The contact apparatus 10 (10A) according to the second aspect further includes second fixed contact 22 and another magnet (permanent magnet 53 on the right side in FIG. 1). Movable contactor 3 further includes movable contact 32 facing second fixed contact 22, first fixed contact 21 and second fixed contact 22 are electrically connected to each other, permanent magnet 53 has a second surface (corresponding to the left side surface of permanent magnet 53 on the right side) facing second fixed contact 22, movable contact 32, and second shield portion 42, second fixed contact 22, movable contact 32, and second shield portion 42 are arranged in the following order: second fixed contact 22; movable contact 32; and second shield portion 42, and second shield portion 42 includes protrusion 421 extending along the left side surface of permanent magnet 53 on the right side, and the right side surface of permanent magnet 53 on the left side and the left side surface of permanent magnet 53 on the right side face each other.

With the above-described configuration, advantageous effects that are substantially the same as those produced according to the first aspect described above can be obtained.

In the contact apparatus 10 (10A) according to the third aspect, the right side surface of permanent magnet 53 on the left side and the left side surface of permanent magnet 53 on the right side have the same polarity.

Furthermore, in the contact apparatus 10 (10A) according to the fourth aspect, protrusion 411 of first shield portion 41 extends downward from an end portion of first shield portion 41 along the first surface of permanent magnet 53 (corresponding to the right side surface of permanent magnet 53 on the left side).

With the above-described configuration, as compared to the case where protrusion 411 is not provided, the surface area of magnetic shield 4 (4A) is large, meaning that the magnetic field of permanent magnet 53 is likely to pass through the magnetic circuit formed by magnetic shield 4 (4A).

Furthermore, in the contact apparatus 10 (10A) according to the fifth aspect, protrusion 411 of first shield portion 41 extends downward from an end portion of first shield portion 41 along the first surface of permanent magnet 53, and protrusion 421 of second shield portion 42 extends downward from an end portion of second shield portion 42 along the second surface of permanent magnet 53.

With the above-described configuration, as compared to the case where protrusion 411 or protrusion 421 is not provided, the surface area of magnetic shield 4 (4A) is large, meaning that the magnetic field of permanent magnet 53 is likely to pass through the magnetic circuit formed by magnetic shield 4 (4A).

Furthermore, in the contact apparatus 10 (10A) according to the sixth aspect, magnetic shield 4 (4A) is in contact with movable contactor 3.

With the above-described configuration, as compared to the case where there is a gap between magnetic shield 4 (4A) and movable contactor 3, the magnetic field is less likely to be applied to the electric arc on the surface of movable contactor 3 that faces magnetic shield 4 (4A). Therefore, it is possible to further reduce the likelihood that end point E1 of the electric arc will move so as to make one revolution around movable contactor 3.

Furthermore, in the contact apparatus 10 (10A) according to the seventh aspect, movable contactor 3 includes a depression and magnetic shield 4 fits into the depression of movable contactor 3, or magnetic shield 4 includes a depression (fitting hole H1) and movable contactor 3 fits into the depression (fitting hole H1) of magnetic shield 4.

With the above-described configuration, it is possible to reduce the likelihood that a gap will be generated between magnetic shield 4 (4A) and movable contactor 3.

Furthermore, in the contact apparatus 10 (10A) according to the eighth aspect, a permeability of magnetic shield 4 (4A) is greater than a permeability of movable contactor 3.

With the above-described configuration, it is possible to increase the advantageous effect of blocking, by magnetic shield 4 (4A), the magnetic field that is applied to movable contactor 3.

The features other than the first aspect are not essential to contact apparatus 10 (10A) and therefore can be omitted as appropriate.

Furthermore, electromagnetic relay 1 (1A) according to the ninth aspect includes: contact apparatus 10 (10A); and electromagnetic apparatus 7 located below contact apparatus 10 (10A) and including shaft 78, wherein shaft 78 moves in conjunction with movable contactor 3, when shaft 78 moves upward, movable contact 31 approaches first fixed contact 21, and when shaft 78 moves downward, movable contact 31 separates from first fixed contact 21.

With the above-described configuration, as compared to the case where magnetic shield 4 (4A) is not provided, it is possible to reduce the likelihood that an electric arc will be repeatedly generated in the space between the fixed contact and movable contact 31; therefore, time required to extinguish the electric arc can be reduced.

REFERENCE SIGNS LIST

1, 1A electromagnetic relay
10, 10A contact apparatus
21 first fixed contact
22 second fixed contact
3 movable contactor
31, 32 movable contact
33 movable contactor body
4, 4A magnetic shield
41 first shield portion
411, 421 protrusion
412, 422 main piece
42 second shield portion
43 joining portion
51 case
52 joining body
53 permanent magnet
54 bridge part
6 holder
61 upper wall part
62 side plate
63 spring bearing part
64 contact pressure spring
78 shaft
8 housing
H1, H2 fitting hole (depression)
H3 through-hole
W1, W2 width

The invention claimed is:

1. A contact apparatus comprising:
- a first fixed contact;
- a movable contactor including a first movable contact facing the first fixed contact;
- a magnetic shield configured to move in conjunction with the movable contactor and including a first shield portion, a second shield portion, and a joining portion joining the first shield portion and the second shield portion together; and
- a first magnet having a first surface facing the first fixed contact, the first movable contact, and the first shield portion, wherein:
- the first movable contact is disposed between the first fixed contact and the first shield portion
- the first shield portion includes a first protrusion and a first main piece, the first protrusion extending downwardly from the first main piece along the first surface of the first magnet, and
- the joining portion extends upwardly from the first main piece.

2. The contact apparatus according to claim 1, further comprising:
 a second fixed contact; and
 a second magnet, wherein:
 the movable contactor further includes a second movable contact facing the second fixed contact,
 the first fixed contact and the second fixed contact are electrically connected to each other,
 the second magnet has a second surface facing the second fixed contact, the second movable contact, and the second shield portion,
 the second movable contact is disposed between the second fixed contact and the second shield,
 the second shield portion includes a second protrusion and a second main piece, the second protrusion extending downwardly from the second main piece along the second surface of the second magnet, and
 the first surface of the first magnet and the second surface of the second magnet face each other.

3. The contact apparatus according to claim 2, wherein
 the first surface of the first magnet and the second surface of the second magnet have a same polarity.

4. The contact apparatus according to claim 2, wherein
 the first protrusion of the first shield portion extends downwardly from an end portion of the first main piece of the first shield portion along the first surface of the first magnet, and
 the second protrusion of the second shield portion extends downwardly from an end portion of the second main piece of the second shield portion along the second surface of the second magnet.

5. The contact apparatus according to claim 2, wherein the joining portion extends upwardly from the second main piece.

6. The contact apparatus according to claim 5, wherein:
 the joining portion comprises a pair of joining portions, and
 a part of the movable contactor is disposed between the pair of joining portions.

7. The contact apparatus according to claim 6, wherein:
 the movable contactor has a center portion having a smaller width than end portions sandwiching the center portion, and
 the center portion is disposed between the pair of joining portions and the pair of joining portions are disposed between the end portions.

8. The contact apparatus according to claim 1, wherein
 the first protrusion of the first shield portion extends downwardly from an end portion of the first main piece of the first shield portion along the first surface of the first magnet.

9. The contact apparatus according to claim 1, wherein
 the magnetic shield is in contact with the movable contactor.

10. The contact apparatus according to claim 9, wherein
 the movable contactor includes a depression and the magnetic shield fits into the depression of the movable contactor, or
 the magnetic shield includes a depression and the movable contactor fits into the depression of the magnetic shield.

11. The contact apparatus according to claim 1, wherein
 a permeability of the magnetic shield is greater than a permeability of the movable contactor.

12. An electromagnetic relay comprising:
 the contact apparatus according to claim 1; and
 an electromagnet apparatus located below the contact apparatus and including a shaft, wherein
 the shaft moves in conjunction with the movable contactor,
 when the shaft moves upward, the first movable contact approaches the first fixed contact, and
 when the shaft moves downwardly, the first movable contact separates from the first fixed contact.

* * * * *